Dec. 29, 1936.     C. W. SINCLAIR     2,066,233
WHEEL
Filed Jan. 25, 1932
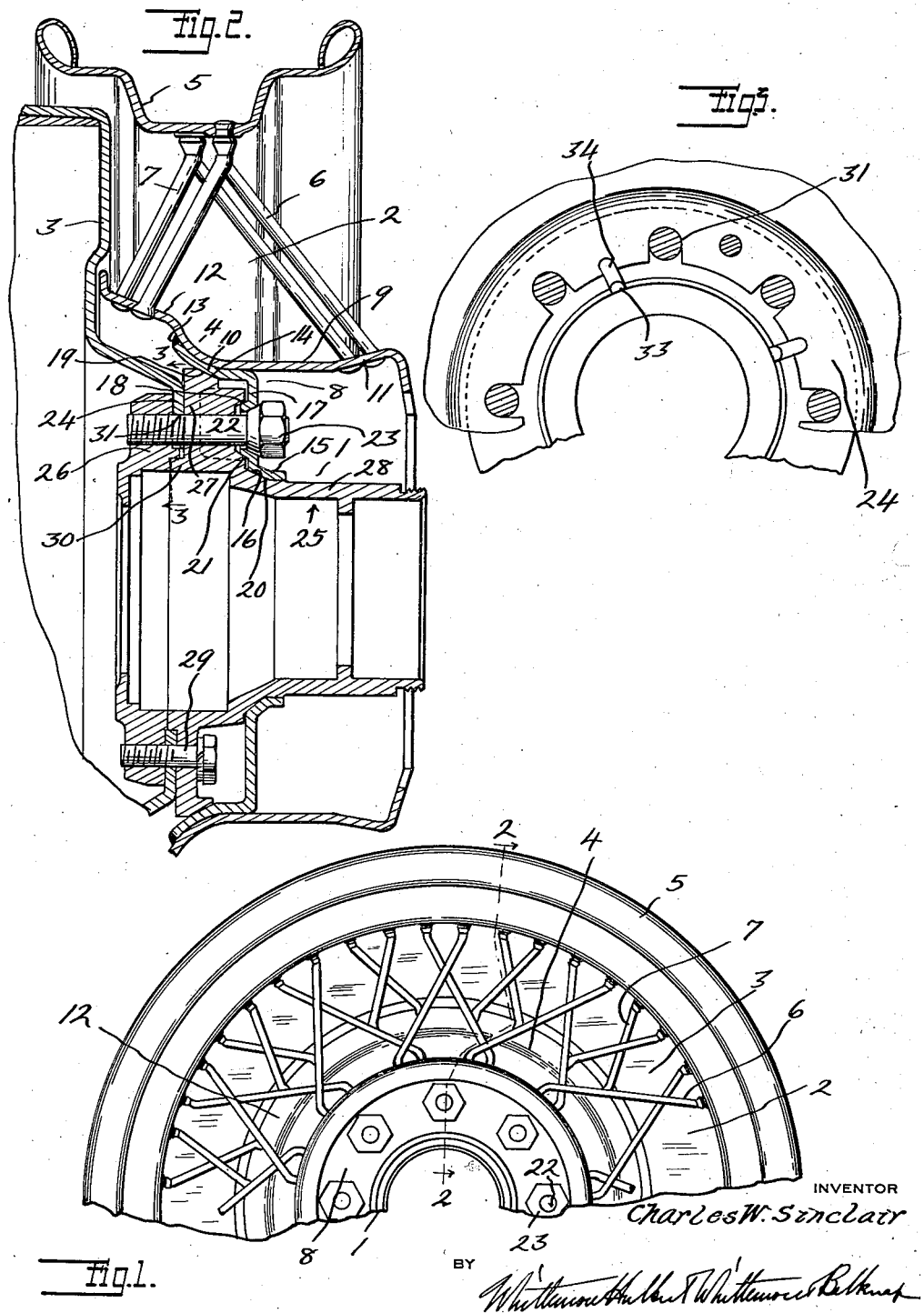
INVENTOR
Charles W. Sinclair
BY
ATTORNEYS Patented Dec. 29, 1936

2,066,233

UNITED STATES PATENT OFFICE 2,066,233

WHEEL

Charles W. Sinclair, Detroit, Mich., assignor, by mesne assignments, to The Kelsey-Hayes Wheel Company, Detroit, Mich., a corporation of Delaware Application January 25, 1932, Serial No. 588,768

1 Claim. (Cl. 301—9)

The invention relates to wheels and has for one of its objects to provide an improved construction of mounting for the wheel body. Another object is to provide a wheel having an inner hub member and a wheel body provided with an outer hub member, these hub members being so constructed that the load is supported at two zones near the median plane of the wheel and spaced axially, but a short distance, apart. A further object is to form the outer hub member with an internal mounting member and a member encircling this mounting member and to so arrange this hub member and the inner hub member that the mounting member is supported upon the inner hub member near the point of attachment of the mounting member to the encircling member. Still further objects are to provide an improved mounting for the brake drum of the wheel.

These and other objects of the invention will become apparent from the following description, taken in connection with the accompanying drawing, in which Figure 1 is a front elevation of a wheel showing an embodiment of my invention;

Figure 2 is a cross section on the line 2—2 of Figure 1;

Figure 3 is a cross section on the line 3—3 of Figure 2.

The wheel shown in Figures 1 to 3 inclusive comprises the inner hub member 1, the demountable wire wheel body 2 and the brake drum 3. The wire wheel body has the outer hub member 4, the rim member 5 which is a tire carrying rim of the drop-center type, and the front and rear rows of spokes 6 and 7, respectively.

The outer hub member 4 is formed with the internal mounting member 8 and the tubular member 9 which encircles this mounting member. Both of these members are preferably formed of sheet metal and the mounting member has at its outer edge the annular flange 10 which has a contour to fit the inner face of the portion of the tubular member 9 between the front and rear anchoring zones 11 and 12, respectively, of this tubular member for the front and rear spokes, respectively. This annular flange 10 is fixedly secured to the tubular member by suitable means, such as the weld 13, and it is provided with the internal tapered seating surface 14 which is located substantially at the median plane of the wheel body. The internal mounting member also has the inner annular flange 15 which is formed with the internal tapered seating surface 16, this seating surface being radially and axially separated from the seating surface 14 and the axial separation being comparatively small, so that the seating surface 16 is located rearwardly of the front spoke anchoring portion 11 a substantial distance. The mounting member 8 further has the resilient radially extending annular portion 17 between the annular flanges 10 and 15 and provided with the rearwardly extending tubular driving projections 18, which have tapered inner and outer faces.

The inner hub member 1 is provided with the external annular tapered seats 19 and 20 for engagement with the tapered seating surfaces 14 and 16, respectively, and these seats taper forwardly and inwardly. The inner hub member also has the forwardly facing annular series of tapered recesses 21 for engagement with the driving projections 18. The normal spacing of the seating surfaces 14 and 16 and the driving projections 18 is such that the seating surfaces firmly engage their respective seats before the driving projections engage the walls of their respective recesses.

Suitable securing devices such as the studs 22, secured to the inner hub member and extending axially through the recesses 21 and the driving projections 18, and the nuts 23 threaded upon the front ends of these studs and having tapered noses for engaging the tapered inner faces of the driving projections detachably secure the wheel body upon the inner hub. The arrangement of the parts is such that as the nuts are tightened down the seating portions are first brought into firm engagement with their respective seats and then the intermediate portion of the mounting member is flexed and the driving projections are brought into firm engagement with the walls of their respective recesses.

It will be noted that this provides a strong, substantial mounting and also that the mounting member is supported near its point of attachment to the tubular member of the outer hub member. Furthermore, and in this connection, it is to be noted that the annular flange 10 of the mounting member is flared outwardly and rearwardly, as is also the contact portion of the tubular member, so that while the wheel body is being mounted upon the inner hub the mounting member is subjected to a force tending to hold the mounting member more tightly against the tubular member.

The brake drum 3 is also mounted upon the inner hub member and, as shown, this brake drum has the central back portion 24 which is the portion anchored to the inner hub member.

This inner hub member comprises the front section 25 and the rear section 26, the front section having the fixed radially extending annular flange 27 which is provided with the seat 19 and the barrel 28 which is provided with the seat 20. The front and rear sections embrace the central back portion 24 of the brake drum and these two sections are secured together by suitable means, such as the diametrically opposite bolts 29 which extend axially through the annular flange 27 and the central back portion and are threaded into the rear section 26. These sections are concentrically positioned by providing at the rear edge of the front section the annular flange 30 which engages a corresponding rabbet in the rear section. The studs 22 extend through the flange 27 and the open ended openings 31 in the central back portion 24 and are threaded into the section 26, so that when the wheel body is secured upon the inner hub member these studs also function in clamping the brake drum to the inner hub member.

Upon reference to Figure 3, it will be noted that the portion 24 of the hub is provided with open ended openings 33, and the portion 25 is provided with registering radially extending grooves 34. The construction is such that lubricant may pass through and be drawn out between the brake drum and the outer hub of the wheel body. This is desirable in that it prevents the escape of lubricant into the brake drum.

What I claim as my invention is:

In a wheel, a wheel body provided with a tubular outer hub member having a tapered portion intermediate the ends thereof, an internal mounting member having a laterally extending flange corresponding in shape to the tapered portion of the outer hub member and having a bearing engagement throughout the area thereof with the inner surface of said tapered portion, an inner hub member having a radially outwardly extending portion provided with a tapered seat engaging the inner surface of the tapered lateral flange on the mounting member for urging the flange into intimate engagement with the tapered portion of the outer hub member upon movement of the mounting member rearwardly relative to the inner hub, and means for securing the mounting member to the inner hub member.

CHARLES W. SINCLAIR.